United States Patent Office 3,317,553
Patented May 2, 1967

3,317,553
5-AROXYMETHYLOXAZOLIDINES
Albert Frederick Crowther and Leslie Harold Smith, Macclesfield, England, assignors to Imperial Chemical Industries Limited, London, England, a corporation of Great Britain
No Drawing. Filed June 18, 1964, Ser. No. 376,231
Claims priority, application Great Britain, July 19, 1963, 28,716/63
6 Claims. (Cl. 260—307)

This invention relates to heterocyclic compounds and more particularly it relates to oxazolidine derivatives which have useful therapeutic properties.

According to the invention we provide oxazolidine derivatives of the formula:

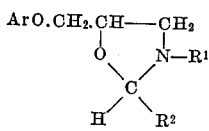

wherein Ar stands for a phenyl, naphthyl or 5,6,7,8-tetrahydro-1-naphthyl radical, any of which may optionally be substituted, $R^1$ stands for an alkyl, cycloalkyl, alkenyl or aralkyl radical, any of which may optionally be substituted, and $R^2$ stands for hydrogen or an alkyl radical, and the salts thereof.

It is to be understood that the above definition of oxazolidine derivatives encompasses all possible stereoisomers thereof, and mixtures thereof. It is also to be understood that, in this specification, unqualified expressions in which there is no mention of substituents, for example "alkyl radical" or "alkenyl radical," only encompass the unsubstituted radicals in question.

As a suitable value for $R^1$ when it stands for an alkyl radical there may be mentioned, for example, an alkyl radical of not more than 10 carbon atoms, for example the isopropyl, s-butyl, t-butyl or 2-ethylhexyl radical. As a suitable value for $R^1$ when it stands for a substituted alkyl radical there may be mentioned, for example, an alkyl radical of not more than 10 carbon atoms bearing one or more hydroxy radicals. As a suitable value for $R^1$ when it stands for an aralkyl radical, optionally substituted, there may be mentioned, for example, an aralkyl radical of not more than 10 carbon atoms, optionally substituted with, for example, one or more hydroxy, alkyl or alkoxy radicals, for example alkyl or alkoxy radicals of not more than 5 carbon atoms. Specific values for $R^1$ when it stands for a substituted alkyl radical or an aralkyl radical are, for example, the 2-hydroxy-1,1-dimethylethyl, benzyl or 1-methyl-3-phenylpropyl radical. As a suitable value for $R^1$ when it stands for a cycloalkyl radical there may be mentioned, for example, a cycloalkyl radical of not more than 10 carbon atoms, for example the cyclohexyl radical. As a suitable value for $R^1$ when it stands for an alkenyl radical, optionally substituted, there may be mentioned, for example, an alkenyl radical of not more than 10 carbon atoms, for example the allyl radical.

As a suitable value for $R^2$ when it stands for an alkyl radical there may be mentioned, for example, an alkyl radical of not more than 10 carbon atoms, for example the isopropyl radical.

As suitable substituents which may optionally be present in the radical represented by the symbol Ar there may be mentioned, for example, one or more substituents selected from halogen atoms, for example fluorine, chlorine or bromine atoms, and alkyl, halogenoalkyl, alkenyl, alkoxy, acyl, aryl, aryloxy, arylthio and aralkyl radicals, for example alkyl, halogenoalkyl, alkenyl, alkoxy, acyl, aryl, aryloxy, arylthio and aralkyl radicals of not more than 10 carbon atoms, for example the methyl, ethyl, isopropyl, t-butyl, t-amyl, trifluoromethyl, methoxy, ethoxy, n-butoxy, acetyl, benzoyl, phenyl, phenoxy, phenylthio or benzyl radical, and hydroxy, nitro and heterocyclic radicals, for example monocyclic and polycyclic heteroaromatic radicals containing one or more oxygen, nitrogen and/or sulphur atoms as hetero-atom(s), optionally substituted, for example such a radical comprising a 5- or 6-membered heteroaromatic ring, for example a 2-pyridyl, 2-indolyl, 2-benzoxazolyl or 2-benzthiazolyl radical, optionally substituted.

As suitable salts of the said oxazolidine derivatives there may be mentioned, for example, acid-addition salts, for example salts derived from inorganic acids, for example hydrochlorides, hydrobromides, phosphates or sulphates, or salts derived from organic acids, for example oxalates, lactates, tartrates, acetates, salicylates or citrates.

As specific oxazolidine derivatives of the invention there may be mentioned, for example, 3-isopropyl-5-(1-naphthoxymethyl)oxazolidine, 3 - (1-methyl-3-phenylpropyl)-5-(3-tolyloxymethyl)oxazolidine and 3-s-butyl-5-(5,6,7,8-tetrahydro-1-naphthoxymethyl)oxazolidine, and the salts thereof.

According to a further feature of the invention we provide a process for the manufacture of the oxazolidine derivatives of the invention which comprises the interaction of an alkanolamine derivative of the formula:

wherein Ar and $R^1$ have the meanings stated above, or a salt thereof, with an aldehyde of the formula $R^2.CHO$ where $R^2$ has the meaning stated above.

The interaction may be carried out in a diluent or solvent, for example ethanol, optionally in the presence of a catalyst, for example hydrochloric acid, acetic acid or iodine, and it may be accelerated or completed by the application of heat. The water formed during the reaction may be removed by azeotropic distillation using a suitable solvent, for example benzene, toluene or chloroform, as an entraining agent, or it may be removed by means of a dehydrating agent, for example anhydrous potassium carbonate.

The oxazolidine derivatives of the invention possess β-adrenergic blocking activity and they are therefore useful in the treatment or prophylaxis of heart diseases such as cardiac arrhythmias and angina pectoris.

According to a further feature of the invention, therefore, we provide pharmaceutical compositions comprising one or more oxazolidine derivatives of the formula:

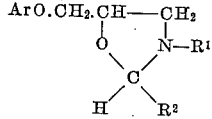

wherein Ar, $R^1$ and $R^2$ have the meanings stated above, or a salt thereof, in admixture with a pharmaceutically-acceptable diluent or carrier.

The pharmaceutical compositions may be, for example, in the form of tablets, capsules, aqueous or oily solutions, aqueous or oily suspensions, dispersible powders, syrups or elixirs, and may be obtained by conventional means.

The invention is illustrated but not limited by the following examples in which the parts are by weight:

*Example 1*

A mixture of 2.6 parts of 1-isopropylamino-3-(1-naphthoxy)-2-propanol, 1 part of a 40% aqueous solution of formaldehyde and 16 parts of ethanol is heated under reflux for 3 hours. A further 1 part of 40% aqueous formaldehyde is then added and the mixture is heated under reflux for a further 16 hours. The solution is then evaporated to dryness in vacuo to leave a residue which is dissolved in ethylacetate. A solution of hydrogen chloride in ether is added and the resulting mixture is filtered. The solid residue is washed with ether and then dried. The dry solid is crystallised from a mixture of n-propanol and ether, and there is thus obtained 3-isopropyl-5-(1-naphthoxymethyl)oxazolidine hydrochloride, M.P. 156° C.

*Example 2*

The process described in Example 1 is repeated except that the 1-isopropylamino-3-(1-naphthoxy)-2-propanol used as starting material is replaced by the appropriate starting material and there are thus obtained the following compounds:

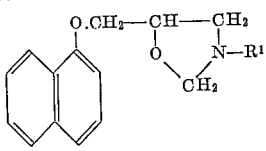

| R¹ | Substituent in naphthalene nucleus | Salt | M.P. (° C.) | Crystallisation solvent(s) |
|---|---|---|---|---|
| Isopropyl | 4-methyl | Hydrochloride | 159–160 | Ethyl acetate/ethanol. |
| Allyl | | Oxalate | 168–170 | Ethanol. |
| 2-hydroxy-1,1-dimethyl-ethyl | | Picrate | 166–168 | n-Propanol. |

*Example 3*

The process described in Example 1 is repeated except that the 1-isopropylamino-3-(1-naphthoxy)-2-propanol used as starting material is replaced by the appropriate starting material and there are thus obtained the following compounds:

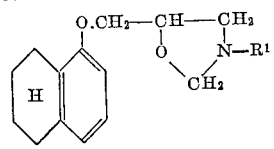

| R¹ | Salt | M.P. (° C.) | Crystallisation solvent(s) |
|---|---|---|---|
| s-Butyl | Hydrochloride | 107–109 | Ethyl acetate. |
| 2-ethyl hexyl | Oxalate | 180 | Ethanol. |
| Benzyl | Hydrochloride | 161–162 | Ethyl acetate. |
| Cyclohexyl | do | 142–143 | Ethyl acetate/ethanol. |

*Example 4*

The process described in Example 1 is repeated except that the 1-isopropylamino-3-(1-naphthoxy)2-propanol used as starting material is replaced by the appropriate starting material and there are thus obtained the following compounds:

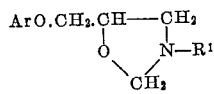

| R¹ | Ar | Salt | M.P. (° C.) | Crystallisation solvent(s) |
|---|---|---|---|---|
| Isopropyl | 3-bromophenyl | Oxalate | 153–154 | Ethanol. |
| Isopropyl | 3-methoxyphenyl | do | 98–100 | Ethyl acetate. |
| Allyl | 3,5-dimethylphenyl | Hydrochloride | 146 | Ethyl acetate/ethanol. |
| 1-methyl-3-phenylpropyl | 3-methylphenyl | do | 120–121 | Ethyl acetate. |
| Isopropyl | Pentachlorophenyl | Oxalate | 218–219 | Aqueous ethanol. |
| 2-hydroxy-1,1-dimethyl ethyl | 2-phenoxyphenyl | Hydrochloride | 160 | 2-ethoxyethanol/ether. |

*Example 5*

A mixture of 2.6 parts of 1-isopropylamino-3-(1-naphthoxy)-2-propanol, 1.4 parts of isobutyraldehyde and 40 parts of benzene is heated under reflux for 16 hours, the water liberated in the course of the reaction being continuously removed by means of a Dean and Starke apparatus. The resulting solution is evaporated under reduced pressure, and the residue is dissolved in warm light petroleum (B.P. 80–100° C.). The solution is cooled and filtered, and the filtrate is evaporated under reduced pressure. The residue is dissolved in ether, and ethereal hydrogen chloride is added. The resulting mixture is filtered, and the solid residue is washed with ether, dried, and crystallised from a mixture of ethyl acetate and propanol. There is thus obtained 2,3-di-isopropyl-5-(1-naphthyloxymethyl)oxazolidine hydrochloride, M.P. 144–146° C.

*Example 6*

A mixture of 10 parts of 3-isopropyl-5-(1-naphthoxymethyl)oxazolidine hydrochloride and 80 parts of mannitol is passed through a 60-mesh screen. Sufficient of a 10% aqueous solution of gelatin is then added to make a stiff paste. The paste is passed through a 16-mesh screen, dried and then passed through a 20-mesh screen. To the resulting granules are added 6 parts of alginic acid and 2 parts of magnesium stearate. The resulting mixture is compressed into tablets by known means. There are thus obtained tablets suitable for therapeutic purposes.

What we claim is:
1. A compound selected from the group consisting of oxazolidine derivatives of the formula:

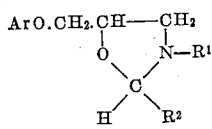

wherein: Ar is selected from the group consisting of phenyl, naphthyl, 5,6,7,8-tetrahydro-1-naphthyl, and said phenyl, naphthyl and 5,6,7,8-tetrahydro-1-naphthyl containing at least one substituent selected from the group consisting of halogen, alkyl of not more than 10 carbon atoms, haloalkyl of not more than 10 carbon atoms, alkenyl of not more than 10 carbon atoms, alkoxy of not more than 10 carbon atoms, acyl selected from the group consisting of acetyl and benzoyl, aryl of not more than 10 carbon atoms, aryloxy of not more than 10 carbon atoms, arylthio of not more than 10 carbon atoms, and aralkyl of not more than 10 carbon atoms, and $R^1$ is selected from the group consisting of alkyl of not more than 10 carbon atoms, hydroxyalkyl of not more than 10 carbon atoms, cycloalkyl of not more than 10 carbon atoms, alkenyl of not more than 10 carbon atoms, and aralkyl of not more than 10 carbon atoms; and $R^2$ is selected from the group consisting of hydrogen and alkyl of not more than 10 carbon atoms; and the pharmaceutically-acceptable acid-addition salts thereof.

2. A compound as claimed in claim 1 wherein Ar is phenyl containing at least one substituent selected from the group consisting of halogen, methyl, ethyl, isopropyl, t-butyl, t-amyl, methoxy, ethoxy, n-butoxy, acetyl, benzoyl, phenoxy, phenylthio, and benzyl.

3. A compound as claimed in claim 1 wherein $R^1$ stands for the 2-hydroxy-1,1-dimethylethyl, benzyl or 1-methyl-3-phenylpropyl radical.

4. A compound selected from the group consisting of 3-isopropyl-5-(1 - naphthoxymethyl)oxazolidine and the pharmaceutically-acceptable acid-addition salts thereof.

5. A compound selected from the group consisting of 3 - (1 - methyl - 3 - phenylpropyl) - 5 - (3 - tolyloxymethyl)-oxazolidine and the pharmaceutically-acceptable acid-addition salts thereof.

6. A compound selected from the group consisting of 3 - s - butyl - 5 - (5,6,7,8 - tetrahydro - 1 - naphthoxymethyl)-oxazolidine and the pharmaceutically-acceptable acid-addition salts thereof.

References Cited by the Examiner
UNITED STATES PATENTS

| | | | |
|---|---|---|---|
| 2,890,985 | 6/1959 | Marsh et al. | 167—65 |
| 2,895,877 | 7/1959 | Marsh | 167—65 |
| 2,964,530 | 12/1960 | Zenitz | 260—307 |
| 3,160,634 | 12/1964 | Hodge | 260—307 |

FOREIGN PATENTS 98,909  8/1961  Netherlands.

ALEX MAZEL, *Primary Examiner.*
HENRY R. JILES, *Examiner.*
RICHARD J. GALLAGHER, *Assistant Examiner.*